(No Model.)
E. F. PFLUEGER.
HEATER ATTACHMENT FOR LAMPS.
No. 544,116. Patented Aug. 6, 1895.
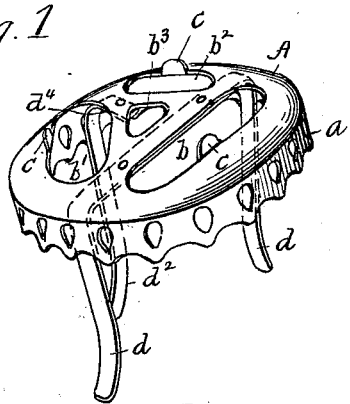
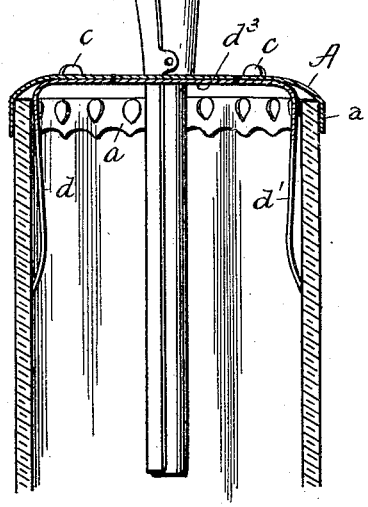
WITNESSES
Geo. M. Anderson
Philip C. Masi
INVENTOR
E. F. Pflueger
E. W. Anderson
his Attorney

UNITED STATES PATENT OFFICE.

ERNEST F. PFLUEGER, OF AKRON, OHIO.

HEATER ATTACHMENT FOR LAMPS.

SPECIFICATION forming part of Letters Patent No. 544,116, dated August 6, 1895.

Application filed March 30, 1895. Serial No. 543,872. (No model.)

*To all whom it may concern:*

Be it known that I, ERNEST F. PFLUEGER, a citizen of the United States, and a resident of Akron, in the county of Summit and State of Ohio, have invented certain new and useful Improvements in Heater Attachments for Lamps; and I do declare the following to be a full, clear, and exact description of the invention, such as will enable others skilled in the art to which it appertains to make and use the same, reference being had to the acompanying drawings, and to letters of reference marked thereon, which form a part of this specification.

Figure 1 of the drawings is a perspective view of attachment. Fig. 2 is a sectional view of invention applied.

The object of this invention is to provide an improved curling-iron heater which can be manufactured at a low cost and which can be readily adjusted to the chimney of a coal-oil lamp, being adapted to retain itself in place on the chimney, and for use with curling-irons of different styles and sizes, and also for general heating purposes.

With this object in view the invention consists in the novel construction and combination of parts, all as hereinafter described, and pointed out in the appended claim.

Referring to the accompanying drawings, the letter A designates the circular body portion of the heater, which is preferably stamped or struck from sheet metal, with a surrounding depending flange or skirt portion $a$, which in use fits over the upper portion of the lamp-chimney.

$b$ $b'$ $b^2$ are three oblong or oval openings which are cut in the body portion to receive and hold different sizes and styles of curling-irons.

$b^3$ is a smaller central opening adapted for smaller irons. Struck up from the outer edge portion of each of the openings $b$ $b'$ $b^2$ is a small raised lip or projection $c$. These lips are for the purpose of supporting a pan or vessel for heating water, &c.

$d$ $d'$ $d^2$ are spring-legs which are secured to the under side of the portion A and which are adapted to extend into the chimney. The legs $d$ $d'$ are usually formed in one piece, being connected by a transverse portion $d^3$, which is riveted to the portion A. The leg $d^2$ has a short arm $d^4$, which is similarly secured to said portion. The lower portion of each leg is curved outwardly, as indicated, to engage the inner wall of the chimney. The legs may be easily bent to adjust them to different sizes of chimneys.

It will be seen that the arms $d^3$ and $d^4$ of the leg serve to strengthen and reinforce the portion A, which, owing to the openings cut therein, would otherwise easily bend.

If preferred I may use two of the spring-legs instead of three—that is to say, the leg $d^2$ may be omitted—or I may, if desired, use four legs. I may also vary the number and form of the openings which receive the irons.

Having thus described my invention, what I claim as new, and desire to secure by Letters Patent, is—

As a new article of manufacture, the herein described attachment for lamps for heating curling irons, and for general heating purposes, said attachment consisting of a flat circular sheet metal body portion having a surrounding, depending flange or skirt designed to fit around the upper edge of a lamp chimney, said body portion having also therein a number of openings of different sizes and shapes to receive different sizes and styles of curling irons, and also small lips struck up from the edges of said openings and designed to support a pan or other receptacle and spring legs having their upper portions bent horizontally and secured rigidly to the under side of said body portion, substantially as specified.

In testimony whereof I affix my signature in presence of two witnesses.

ERNEST F. PFLUEGER.

Witnesses:
T. W. WAKEMAN,
G. K. A. GALL.